April 4, 1961  W. H. KEITER  2,977,709
TROLLING DEVICE
Filed April 1, 1958
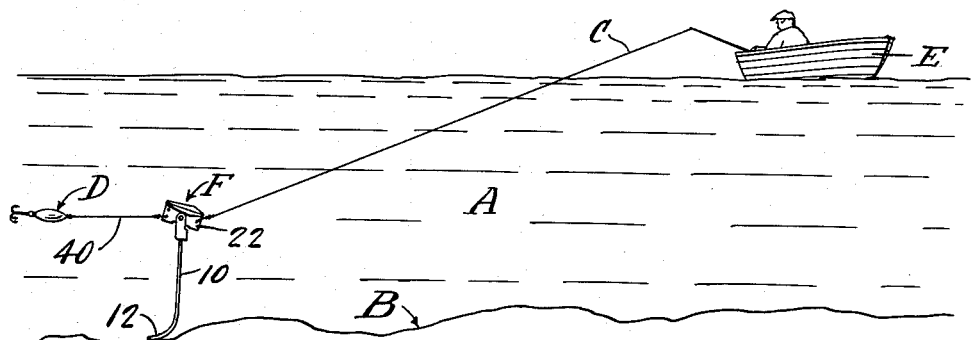
FIG-1-
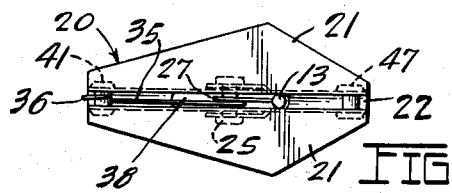
FIG-3-
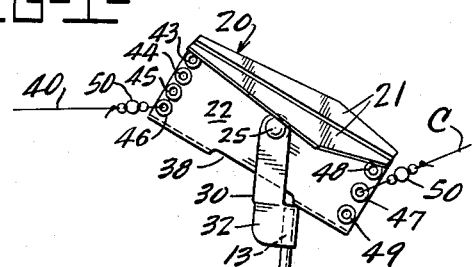
FIG-6-
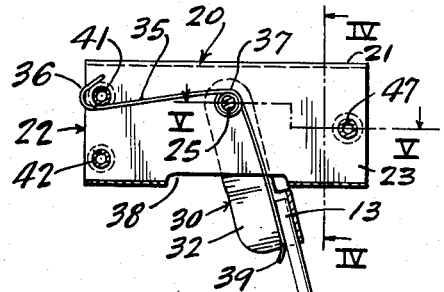
FIG-2-
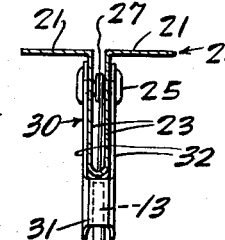
FIG-4-
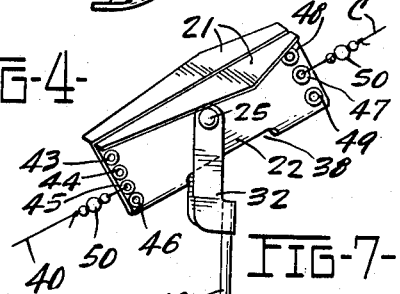
FIG-7-
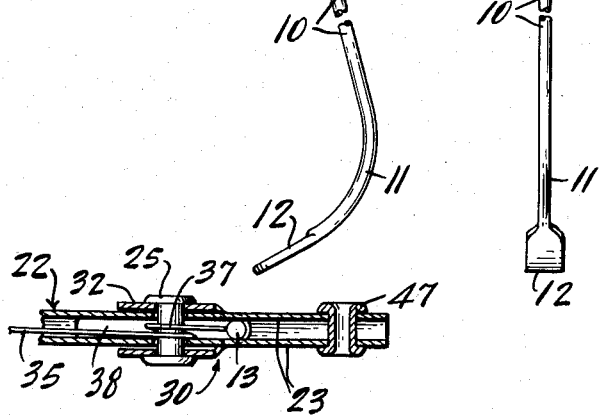
FIG-5-
INVENTOR:
WILLIAM H. KEITER.
BY
*Hugh A. Kirk*
ATTY.

United States Patent Office 2,977,709
Patented Apr. 4, 1961

2,977,709
TROLLING DEVICE
William H. Keiter, 1011 Bricker St., Toledo 11, Ohio Filed Apr. 1, 1958, Ser. No. 725,573

10 Claims. (Cl. 43—43.13)

This invention relates to a fishing device. More particularly it deals with a kite type sinker for controlling the depth of fishing lures when trolling, which device is an improvement over Wm. H. Keiter Patent No. 2,787,077 issued on April 2, 1957.

Accordingly, an object of this invention is to provide a device which may be attached in a trolling line near the lure or bait and which will closely travel the ground contours of streams, rivers or lakes so that a lure may follow at a pre-determined spaced distance from the bottom of the water being fished.

Another object is to provide such a device which will automatically tend to rise to the surface of the water during trolling when a fish has been caught by the lure.

Another object is to provide such a device which will automatically rise slightly in the water when it hits an obstacle or snag on the bottom so that it will not snag on rocks, sticks, logs, etc., but will glide smoothly over such obstacles while permitting the lure behind the device to follow without snagging on them.

Another object is to provide such a device of simple and light construction, economical manufacture, and efficient performance which can be used readily and beneficially during trolling.

Another object is to provide such a device which will quickly descend below the turbulence of the propellers or wake of the trolling boat although it is relatively light in weight, and accordingly use less line to get to and maintain its position at or near the bottom of the water being fished.

Another object is to provide a simpler, more efficient, more effective, more diversified, more reliable, and easier to manufacture, maintain and use kite type trolling device than that disclosed in said prior Keiter patent.

Another object is to provide such a device in which even soft or muddy bottoms of the water being fished may be felt and from which a predetermined spaced distance may be maintained without digging or sinking into the soft bottom.

Another object of this invention is to provide such a device which may be employed equally effectively with different weight lures, such as for example with either a relatively light or a relatively heavy lure.

With these other objects in view, the invention may comprise: a rigid drag leg, bar, strip or feeler leg which may have a bent and/or flattened lower portion for following any type bottom of the body of water being fished and for preventing the snagging of said device on submerged objects; a hydrofoil or kite having a pair of fins or wings being directly pivotally attached to the upper end of said feeler leg; and a relatively concealed resilient tensioning means normally tilting the hydrofoil and its wings in a downward direction relative to said leg. This tensioning means controls the device so that it will quickly descend to its position near the bottom of the body of water being fished and maintain itself in such a position until a force is applied to said device either by a pull on the lure by the catching of a fish or by the contact of the lower end of the leg with an obstacle on the bottom to tilt said hydrofoil in an upward direction causing said device to raise toward the surface of the water until said force ceases to act on said device.

The above mentioned and other features and objects of this invention and the manner of attaining them will become more apparent and the invention itself will be best understood by reference to the following description of embodiments of the invention taken in conjunction with the accompanying drawing, wherein:

Fig. 1 illustrates this invention as it is intended to be used in troll fishing;

Fig. 2 is an enlarged vertical or side cross-sectional view of one embodiment of the device shown in Fig. 1 illustrating the normal angular relationship of the parts of the device;

Fig. 3 is a top plan view of the device shown in Fig. 1;

Fig. 4 is a front elevational and sectional view through lines IV—IV of Fig. 2 showing the construction of the upper part of said device;

Fig. 5 is a sectional view through line V—V of Fig. 2 showing the detailed construction of the upper part of the device;

Fig. 6 is a side perspective view of another embodiment of the device of Fig. 1 showing a larger plurality of lure fastening holes and the angular position of the parts during descent of the device in the water toward the bottom being fished; and Fig. 7 is a rearward and side perspective view of the device of Fig. 6 showing the angular position of the parts during surfacing or rising over a contacted obstacle on the bottom of the water being fished.

With reference to Fig. 1, A denotes a body of water being fished, having a bottom B. Trolling line C and fishing lure D are drawn through the water by the fisherman in the boat E being propelled along the surface of the water A. For purposes of controlling the depth at which the lure is drawn, together for purposes as mentioned herein, there is provided the device F of this invention at the end of the troll line C and spaced a few feet from the bait or lure D.

This device F may comprise a rigid drag bar, strip, feeler or leg 10 having a bent or curved section 11 and a flattened end or shoe portion 12 at its lower end and having a hydrofoil or kite unit 20 pivotally attached to its upper end 13. This leg 10 may comprise a pre-determined length of wire or rod steel stock which may be bent and flattened to form the bottom feeling end portions 11 and 12.

The hydrofoil or kite unit 20 may comprise a pair of outwardly extending wings or fins 21 which may be integral with its central vertically depending keel or body portion 22. This central portion 22 may comprise adjacent parallel spaced normally vertical portions 23 formed as upwardly extending sides of a U-bent piece of sheet material, such as of a non-corrosive metal, for example, aluminum, stainless steel, coated sheet iron, plastic material, or the like. The fins 21 may be outward extensions of the sides 23, each fin 21 being substantially perpendicular to its respective integral side portion 23. These fins 21 may be of any desired shape or size to suit the particular trolling needs of the speed of trolling, or the weight of the device, and the like.

The hydrofoil unit 20 shown herein has its portion 22 connected by a pivot 25 to a clevis-like means 30 which is rigidly attached to the upper end 13 of said leg 10, such as by press-fitting or bending the connecting portion 31 between the adjacent parallel spaced side portions 32 of said clevis-like means 30 around the upper end 13 of said leg 10 and then welding or soldering this section 31 to the top end portion 13. A resilient tension member, such as a tension spring 35 may be employed to maintain the relative positions of the parts of the device as shown in Fig. 2, which tension member 35 may have its end portion 36 bent around one of a plurality of lure attaching means 41 in the rear of the kite body portion 16. The middle portion 37 of the spring 35 may be wrapped around the pivot 25 and thence extend through an aperture 38 in the U-shaped bottom portion of the kite unit 20 so that its other end portion 39 may abut against the top portion 13 of said leg 10 in the clevis 30. This spring 25 thus normally urges and maintains the leg 10 in a forward position with respect to the tilt of the kite unit 20, and thus the device F is guided toward and near the bottom B of the water A being fished (see Figs. 1 and 6).

The trolling line C may be moved toward the right as viewed in Fig. 1, and the lower feeler end 12 of the leg 10 will accordingly just slightly drag over the bottom B so that the device F will be maintained in its substantially vertical position by the tension member 25 and the lure D and its leader, lure or bait line 40 attached to the device F will be substantially normally spaced a distance corresponding to the length of the leg 10 from the bottom B at all times. This distance is usually between about nine and twenty-four inches, but preferably about one foot, varying with the size and weight of the device and the type of lure to be used with it.

The lure attaching line 40 secures the lure D to one of a plurality of attaching means or apertures such as hollow rivets 41 and 42 in Fig. 2 or rivets 43 through 46 in Figs. 6 and 7. Which one of a vertical arrangement of the apertures is to be used is determined according to the relative weight of or drag on the device F by the lure; the lower apertures 42, 45 or 46 being for a heavier lure so that its own drag won't cause kite device F to remain on the surface of the water, and the upper apertures 41, 43 or 44 being for a lighter lure. Consequently by properly selecting the lure line attaching aperture, a given lure may be caused to follow at a constant level in the water when being pulled, without dragging its hooks on the bottom or becoming snagged on objects on the bottom, depending of course upon the length of the lure line 40, the weight of the lure, and the speed of trolling. Usually the length of this lure line is not over about three feet and usually about two and one-half feet long.

When a fish is caught on the lure D or when the leg 10 strikes an obstacle O on the bottom B, the kite device 20 will be tilted upwardly (see Fig. 7) to rise over the obstacle O because of the resistance of the spring 35 and/or the force couple produced at the device 20 by the pulls in the troll lines C and 40. Catching a fish on the line D causes the leader line or wire 40 to exert a rearward pull on the kite portion 20 to which it is attached at one of the apertures 41 through 46, which pull will cause the fins 21 to be inclined upwardly under the influence of the couple formed also by the tension in the troll line C, which line C may be connected by a similar attaching means, hollow rivet, or aperture 47, (or apertures 48 and 49 in Figs. 6 and 7) in the opposite or front and lower end of the portion 22 of the kite 20. This upward tilting action of the kite fins 21 when the pull of a catch exists on the lure line 40, is caused by the force couple produced by the location of the front and rear apertures (45 and 47 in Fig. 7) and the perpendicular distance between the opposite pulling forces in troll line C and lure line D at the device F. If desired, a swivel 50 may be placed in line C, and also in the lure line 40, adjacent to the device F, such as at the apertures 41 through 49 to prevent twisting of either the lines C and/or 40 from affecting the normal vertical position of the device F in the water A maintained by the weight of the leg 10.

The whole or any part of the device F may be coated, painted or colored to blend with the bottom B or to attract fish, as well as to protect the parts from corrosion.

While there is described above the principles of this invention in connection with specific apparatus, it is to be clearly understood that this description is made only by way of an example and not as a limitation to the scope of this invention.

What is claimed is:

1. A trolling device for insertion between a troll line and a bait line to maintain a bait lure during fishing at substantially a pre-determined distance above the bottom of the water being fished, and to respond to a pull on the bait lure or to engagement with an obstacle on the bottom to raise the bait lure, said device comprising: a hydrofoil unit having a fin portion and a central keel portion fixedly attached to said fin portion, means at the forward end of said keel portion for attaching a troll line, a plurality of means spaced from said fin portion at the rearward end of said keel portion for attaching a bait line, pivot means on said keel portion between said ends, a substantially rigid leg suspended by its upper end from said pivot means for limited pivotal movement relative to said unit, said leg corresponding in length to said pre-determined distance above the bottom of the water being fished, and having a feeling portion at its lower end for feeling said bottom, and resilient means enclosed in said keel portion for normally urging said leg forwardly and urging the forward part of said hydrofoil unit downwardly with respect to each other.

2. A device according to claim 1 wherein said bottom feeling portion of said leg comprises a rearwardly bent portion of said leg.

3. A device according to claim 2 wherein said rearwardly bent portion has a flattened bottom engaging portion.

4. A device according to claim 1 wherein said bottom feeling portion of said leg comprises a shoe portion.

5. A device according to claim 1 wherein said bottom feeling portion of said leg has a flattened bottom engaging portion.

6. A device according to claim 1 wherein said means for attaching said lines to said unit includes apertures at said ends of said unit.

7. A device according to claim 1 including a plurality of said attaching means at the forward end of said keel portion for said troll line.

8. A device according to claim 1 including a swivel between one of said lines and said attaching means.

9. A device according to claim 1 wherein said upper end of said leg comprises a clevis means straddling said keel portion.

10. A trolling device according to claim 1 wherein said keel portion comprises a pair of spaced walls, and said resilient means is located between said walls.

References Cited in the file of this patent

UNITED STATES PATENTS

| | | |
|---|---|---|
| 2,542,347 | Muller | Feb. 20, 1951 |
| 2,645,053 | Moritz | July 14, 1953 |
| 2,648,929 | Dunn | Aug. 18, 1953 |
| 2,726,475 | Wiselka | Dec. 13, 1955 |
| 2,787,077 | Keiter | Apr. 2, 1957 |
| 2,843,965 | Whitbeck | July 22, 1958 |